United States Patent [19]

Amdall et al.

[11] 4,064,769
[45] Dec. 27, 1977

[54] CONTROL PEDAL-MECHANICAL SPEED WITH ELECTRICAL DIRECTION CONTROL

[75] Inventors: John K. Amdall, Peoria; Gerald P. Simmons, Washington, both of Ill.

[73] Assignee: Caterpillar Tractor Co., Peoria, Ill.

[21] Appl. No.: 634,949

[22] Filed: Nov. 24, 1975

[51] Int. Cl.² ............................................. G05G 13/00
[52] U.S. Cl. .......................................... 74/878; 74/478; 74/512
[58] Field of Search ................. 74/877, 878, 843, 474, 74/478, 478.5, 512, 513, 560

[56] References Cited

U.S. PATENT DOCUMENTS

| | | | |
|---|---|---|---|
| 1,679,353 | 8/1928 | Dulaney | 74/478 X |
| 2,123,298 | 7/1938 | Bollinger et al. | 74/877 |
| 2,612,247 | 9/1952 | Randol | 74/843 X |
| 2,968,967 | 1/1961 | Ross, Jr. | 74/877 |
| 3,691,863 | 9/1972 | Shaffer | 74/478 |
| 3,952,512 | 4/1976 | Feller | 74/478 X |

Primary Examiner—James F. Coan
Attorney, Agent, or Firm—Phillips, Moore, Weissenberger, Lempio & Majestic

[57] ABSTRACT

A control linkage for combined simultaneous control of an engine throttle and a transmission ratio control includes a foot pedal mounted for physical movement about a first axis from its zero position, a throttle linkage connecting the pedal to an engine throttle for movement therewith through the control range and transmission ratio control linkage connecting the control pedal to a ratio control valve for movement with the pedal through the control range and means for shifting the ratio control linkage to a first position for movement of the valve in a forward direction upon movement of the control pedal and shiftable to a second position for movement of the valve in the reverse direction upon the same movement of the control pedal.

6 Claims, 4 Drawing Figures

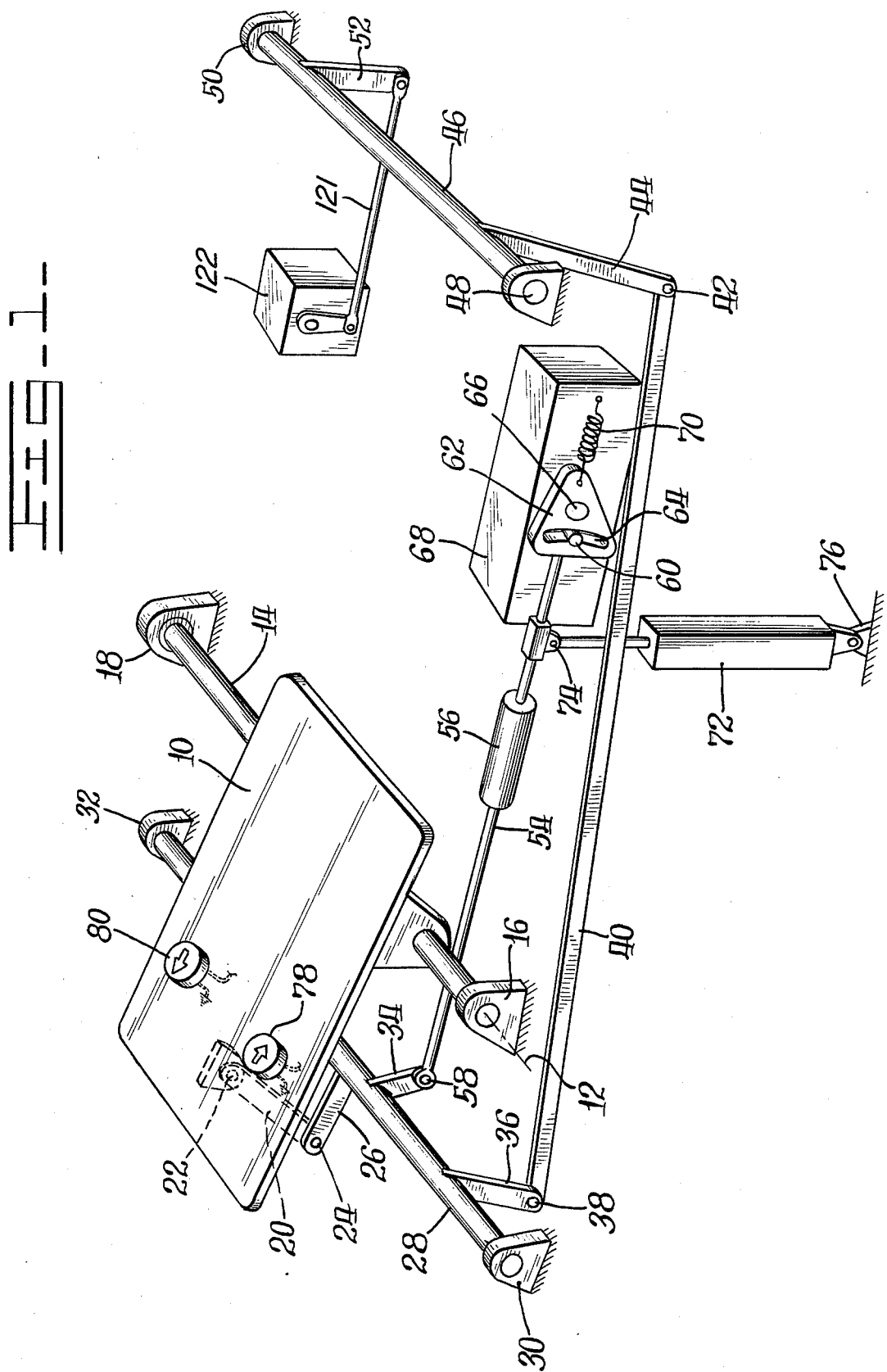

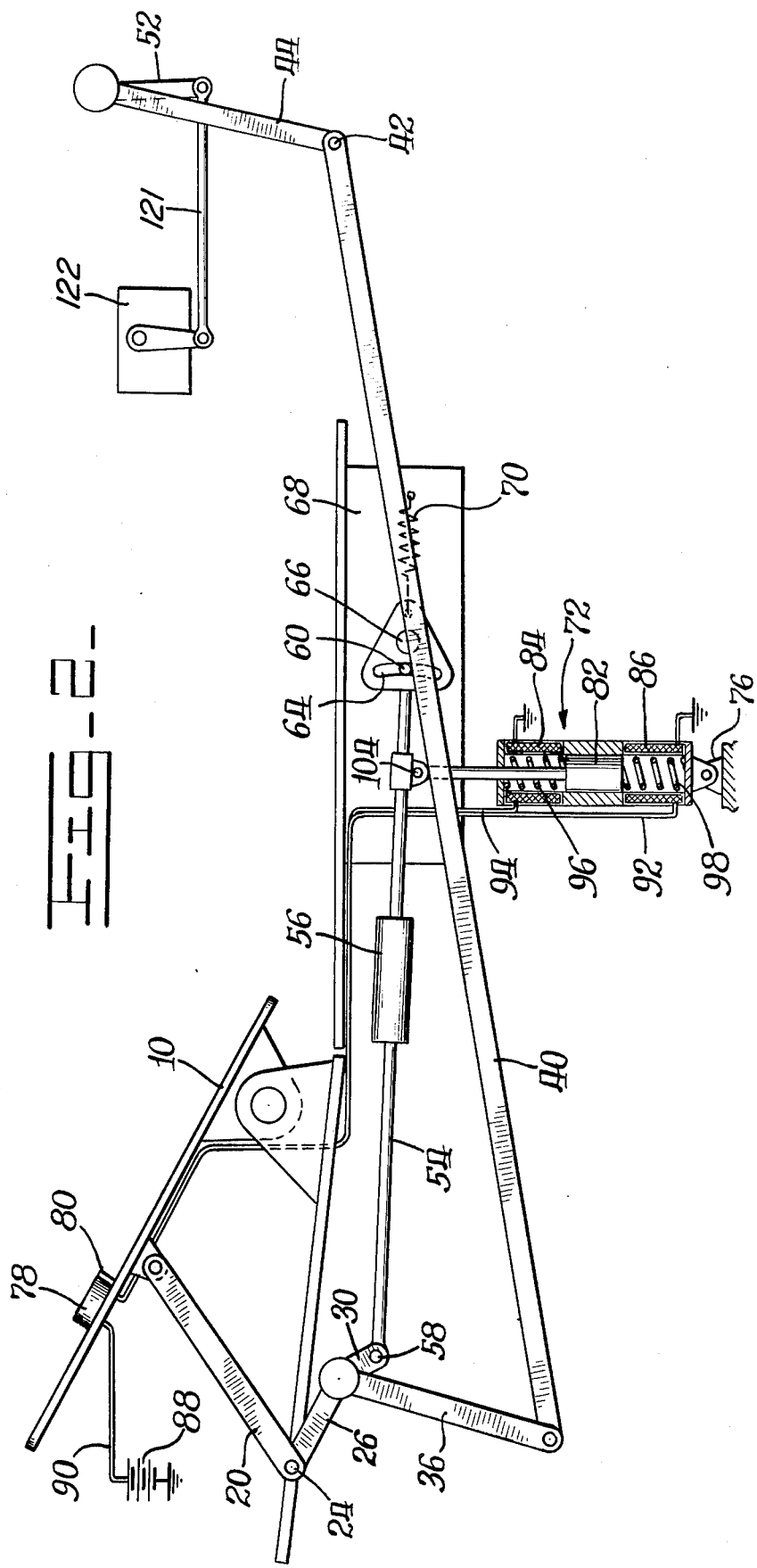

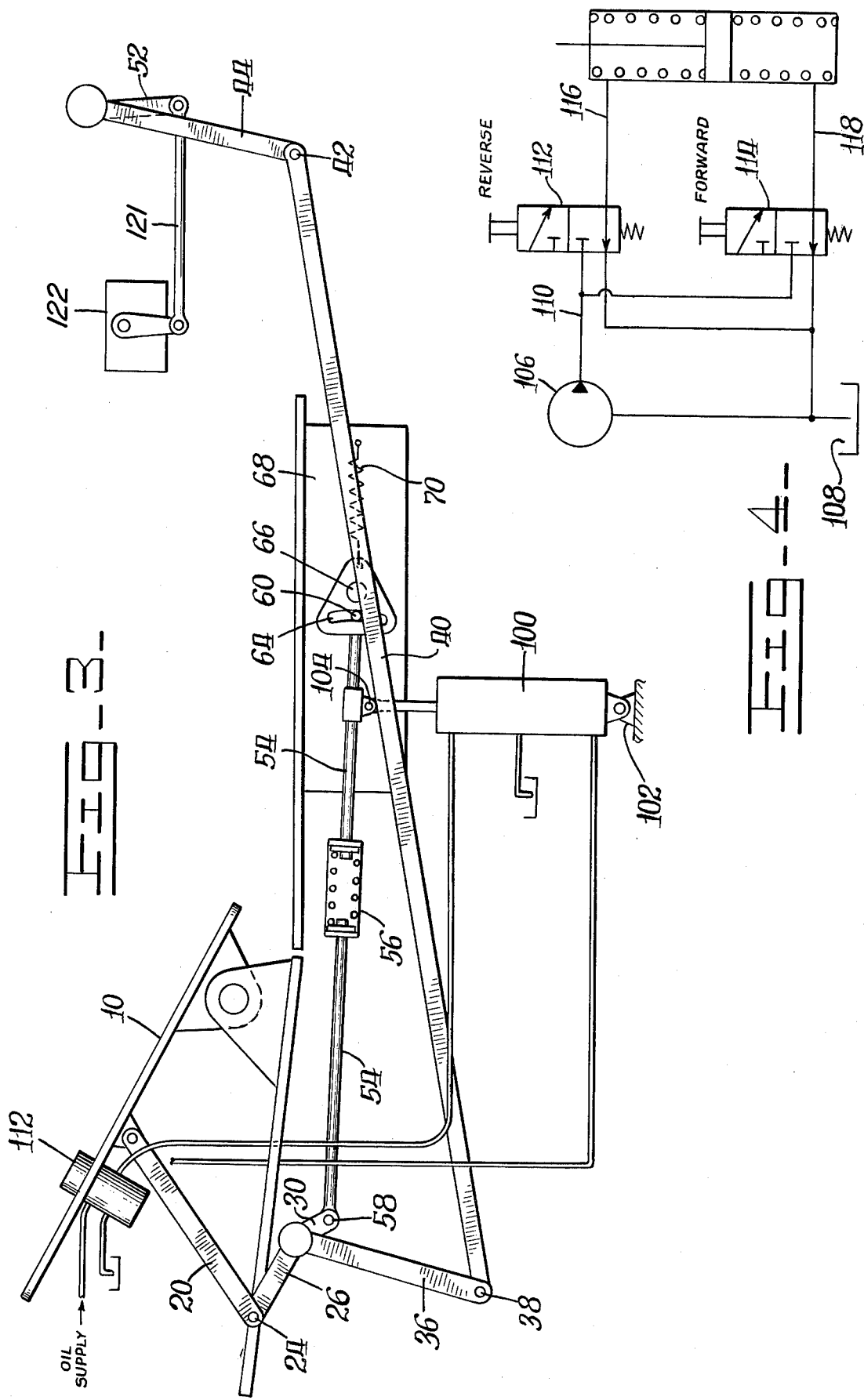

CONTROL PEDAL-MECHANICAL SPEED WITH ELECTRICAL DIRECTION CONTROL

BACKGROUND OF THE INVENTION

The present invention relates to control linkages and pertains particularly to a combined linkage for the combined and simultaneous control of an engine throttle and a transmission from a single foot pedal.

Many vehicles such as lift trucks and the like have article-handling implements mounted thereon. These implements are normally controlled by the operator simultaneously with control of the vehicle. It is frequently necessary that the operator be able to effectively manipulate the article-handling implements at the same time that he is effectively manipulating the vehicle.

The operator of a lift truck, for example, may raise or lower the article-handling implement at the same time that he is moving either forward or backward and at the same time that he is steering the vehicle. Such maneuvers normally require simultaneous use of both hands and both feet.

Many of these functions are frequently incorporated in foot pedals. The most desirable pedal configuration is to have only one direction input to a pedal. This, however, tends to require so many pedals or to cause clutter and confusion.

In order to make such vehicles more efficient and easier to operate, it is necessary to combine as many of the functions as possible. It is necessary, for example, to incorporate as many functions as possible in a single foot pedal. This is necessary because it is essential that one foot be available for operation of the creeper pedal of the vehicle.

Where such vehicles employ hydrostatic transmission, it is frequently feasible to combine the throttle control with the transmission control. This is possible where the speed control or ratio control of the vehicle employs a linkage which is operative to swivel the swash plate of the hydrostatic transmission from a zero to a forward or reverse position. It is also desirable, however, that both forward and reverse be incorporated in a single pedal in order to reduce the number of pedals necessary on the vehicle and also that the throttle be incorporated in the same pedals. It is also necessary that the throttle be operable independent of the shifting of the ratio of the vehicle, in order that power from the vehicle may be utilized for manipulating the article-handling implements at a time when the vehicle is stationary.

Rocker type pedals have been proposed in order to incorporate more functions in a single pedal. The rocker type pedal, however, requires an unnatural motion, and is awkward and tiresome to control.

SUMMARY AND OBJECTS OF THE INVENTION

It is accordingly the primary object of the present invention to provide a control linkage arrangement employing a single control pedal having a single direction of depression for simultaneous combined control of a vehicle throttle and transmission ratio control.

Another object of the present invention is to provide a linkage control arrangement having a single control pedal having a single direction of depression from neutral for controlling forward and reverse of the vehicle as well as the engine speed of the vehicle.

Another object of the present invention is to provide a control linkage for the vehicle employing a single control pedal movable in a single direction from neutral for controlling forward and reverse of a hydrostatic transmission at the same time controlling the throttle of the engine of a vehicle with means for permitting independent control of the throttle of the vehicle by means of the same control pedal.

In accordance with the primary aspect of the present invention a control linkage includes a single control pedal for combined and simultaneous operation of both the throttle of the vehicle and the directional and ratio control of the transmission of the vehicle upon depression of the pedal in a single direction from neutral including linkage means connecting the pedal to the throttle for movement therewith, linkage means for connecting the ratio control to the pedal for movement therewith and including means for shifting the ratio control linkage to a position for movement of the ratio control in a forward direction upon movement of the pedal, and for shifting the ratio control linkage to a position for movement of the ratio control means in a reverse direction upon movement of the pedal and a position for permitting control of the vehicle throttle without movement of the ratio control.

BRIEF DESCRIPTION OF THE DRAWING

The above and other objects and advantages of the present invention will become apparent from the following description when read in conjunction with the drawings wherein:

FIG. 1 is a perspective view of a schematic illustration of linkage in accordance with the present invention;

FIG. 2 is an elevational view of the control linkage of FIG. 1 with portions in section to reveal details;

FIG. 3 is an elevational view of an alternate embodiment of the present invention; and, FIG. 4 is a schematic illustration of a circuit for the embodiment of FIG. 3.

DETAILED DESCRIPTION OF PREFERRED EMBODIMENT

Turning now to the drawings, particularly to FIG. 1, there is illustrated an embodiment of the invention comprising a foot pedal 10 mounted for rotation about an axis 12 which may, for example, coincide with the axis of the shaft or the like 14 on which the pedal 10 is mounted. The shaft may be simply a pin or the like to support the pedal 12 or it may comprise a shaft connected thereto and rotatable therewith for controlling of or transmission of motion to another control element or the like. The shaft 14 is mounted in suitable support blocks or the like on the frame of the vehicle which may also include bearings on the like.

Movement of the pedal 10 from a zero position, as shown, downward translates motion to a linkage arrangement which translates this motion to a throttle linkage and to a ratio control linkage of a transmission. The linkage includes a link 20 pivotally connected at 22 to pedal 10 and at the opposite end pivotally connected at 24 to a lever on 26 of a second shaft 28 which is disposed parallel to the first axis 12. The second axis 28 is suitably mounted in spaced bearings 30 and 32 and includes arms 34 and 36.

The arm 36 comprises a portion of the throttle linkage and is pivotally connected at 38 to an elongated link 40 which in turn is pivotally connected at 42 to an arm 44 of a shaft 46. The shaft 46 is pivotally mounted in suitable bearings or the like 48 and 50 and includes an arm 52 connected for operation of a vehicle (not shown).

The transmission ratio control linkage includes a link 54 including lost motion means 56 and pivotally connected at one end 58 to arm 34 and pinned at the other end to a pin 60 which is pivotally connected to a lever 62 by means of an elongated slot 64. The lever 62 is pivotally connected to a shaft 66 which in turn is connected to a suitable valve or control mechanism 68 which controls the displacement of a pump (not shown) of a hydrostatic transmission of a vehicle. Movement of the lever 62 rotates shaft 66 which in turn moves the control valve in either a forward or reverse direction.

The lever 62 is of generally triangular transfiguration and includes or defines a slot 64 which extends transverse and to either side of the pivotal axis and of shaft 66. This arrangement provides a lever onto either side of shaft 66 so that movement of the linkage 54 moves shaft 66 in one or the other direction depending on which end of the slot 64 the pin 60 is disposed. A spring 70 biases the lever 62 to its neutral position. Means for shifting the pin 60 to either end of the slot 64 for forward or reverse position comprises an actuator 72 which is pivotally connected at one end 74 to the link 54 and at the other end 76 to the vehicle or the like. When the pin 60 is in the neutral or centered position as shown, movement of the pedal 10 is effective to move only the accelerator pedal or linkage and accelerator arm 52 without movement of the ratio control linkage or lever. The pedal 10 is permitted to move because of the lost motion portion or link 56 of the ratio control linkage.

Shifting of the ratio control linkage is accomplished by activating the actuator 72. This is accomplished simply by depressing either one of pressure-responsive means or buttons 78 and 80. The actuator in this embodiment comprises a double solenoid having, for example, a core 82, a first coil 84 and a second coil 86 to which power is supplied in the form of electrical current from a suitable source such as a battery 88. The current is supplied by circuit including suitable conductors 90 and 92 connected thereto the circuit of which is completed by means of contact switches which are comprised of the buttons or pressure-responsive means 78 and 80. Current is supplied by conductor 90 to one side of the respective buttons 78 and 80 and the other side of the respective circuits are completed by conductors 92 and 94 respectively. In the illustrated embodiment, the left-hand button or switch 78 is a reverse switch and is responsive to complete a circuit for activating the actuator 72 for shifting the linkage 54 and pin 60 in one direction so that movement of the pedal 10 shifts or rotates the lever 62 and shaft 66 in a reverse direction for shifting the valve 68 in the reverse direction. Upon depressing button 80 for activating the pressure-responsive switch thereof, a forward circuit is activated which activates actuator 72 shifting the pin 60 in the opposite direction for rotation of the shaft 66 in the forward direction, thus movement of valve 68 in the forward direction upon depressing of the pedal 10.

The solenoid 82 of the actuator is preferably biased to its center position by means as illustrated, such as compression springs 96 and 98. Thus the ratio control linkage is normally in the neutral position unless activated. The pedal 10 is preferably of sufficient width that an operator may depress the pedal by positioning his foot between the pressure-responsive switches 78 and 80 without depressing either switch. In this case, the ratio control linkage is in neutral position or condition and depressing of the pedal 10 will simply operate the throttle control of the engine for accelerating the engine. Such conditions are required where, for example, it is necessary to rev the engine for manipulation of the article-handling implements of the vehicle while the vehicle is stationary. If, for example, a great deal of power is required from the vehicle engine in order to lift a heavy load, then such acceleration or throttle control of the vehicle engine is available without affecting movement of the vehicle in either direction. This power may also be obtained by pressing the throttle pedal or a direction switch and also pressing the creeper pedal. The creeper simply dumps the oil flow in the hydrostatic transmission so that there is no power output.

Turning now to the embodiment of FIGS. 3 and 4, identical elements are identified by identical numerals. Accordingly, the distinction in this embodiment lies within the use of a hydraulic actuator for shifting the ratio control linkage from the neutral position to either one of the forward or reverse positions. In this embodiment, a hydraulic actuator 100 is connected in the usual manner at one end to the frame 102 of the vehicle and to the other end by pivot means 104 to the link 54 of the ratio control linkage. The actuator 100 is a double-acting hydraulic actuator with fluid supplied thereto from a suitable source such as a pump 106 which draws fluid from a reservoir 108 and supplies it by way of conduit 110 to pressure-responsive valves 112 and 114. The pressure-responsive valves 112 and 114 are mounted on the pedal 10 and accordingly when activated direct fluid by way of conduit means 116 or 118 to the double-acting hydraulic actuator 100. Thus in this arrangement the actuator 100 is preferably biased to the neutral position until one or the other of the forward or reverse valves 112 or 114 is depressed. Upon depression of one of the other of the valves, fluid is then communicated from the pump 106 to one or the other side of the actuator 100, thus actuating the actuator for shifting of the linkage 54 to shift the pin 60 to one or the other end of the slot 64 for thereby selecting either forward or reverse of the ratio control linkage upon depression of the control pedal 10.

The throttle linkage 36, 40, 44, 46 and 52 is connected by a suitable link 121 to an engine throttle or governor 122 which operates in the usual manner to control the rpm of the vehicle engine.

While the present invention has been described with respect to specific embodiments, it is to be understood that numerous changes and modifications may be made therein without departing from the spirit and scope of the invention as defined in the appended claims.

We claim:

1. A control linkage for combined simultaneous control of an engine throttle and a transmission control valve ratio selector element from a single pedal, comprising:

a single foot pedal mounted for pivotal movement a about a first axis from a zero position in a first direction through a control range of selectively variable throttle positions and transmission drive ratios, said pedal having a surface for receiving an operator's foot which surface is fixed against pivoting movement about any axis other than said first axis;

throttle linkage means mechanically linking said engine throttle to said single pedal for causing proportionate movement of said throttle through said control range as said pedal is pivoted in said first direction; and transmission ratio control linkage means for selectively linking said transmission control valve ratio selector element to said single foot pedal for proportional movement therewith through said control range, said ratio control linkage means including shifting means for shifting said ratio control linkage means to a first position, in response to placement of said operator's foot at a first location on said pedal surface, for proportional movement of said control valve ratio selector element in a forward direction upon movement of said foot pedal in said first direction and for shifting said linkage to a second position, in response to placement of said operator's foot at a second different location on said pedal surface, for proportional movement of said control valve ratio selector element in a reversed direction upon movement of said foot pedal in said first direction, and for maintaining said control valve ratio selector element stationary upon pivoting of said pedal in said forward direction in response to placement of said operator's foot at a third location on said pedal surface.

2. The control linkage of claim 1 wherein said transmission ratio control linkage means comprises:

a transmission ratio selector lever mounted for rotation about a second axis spaced from and parallel to said first axis;

said lever including means defining a slot having a midpoint spaced radially from said second axis and extending transverse to and to either side of a plane defined by said second axis and said midpoint;

an elongated link member connecting said pedal to said lever;

pin means slidably mounted in said slot for connecting said link member to said lever for transmitting motion from said pedal thereto; and actuator means for selectively shifting said pin to either end of said slot.

3. The control linkage of claim 2 including means for normally biasing said pin means to a position in said slot at which said link member is aligned with a radius of said second axis for establishing a neutral position of said ratio selector element; and wherein said link member includes lost motion means permitting movement of said pedal for movement of said throttle linkage without movement of said lever upon said movement of said pedal in said first direction in response to said placement of said operator's foot at said third location on said pedal surface.

4. The control linkage of claim 3 wherein said shifting means includes:

a source of power for said actuator; and first pressure-responsive means mounted on said pedal surface at said first location for selectively communicating power from said source to said actuator to shift said ratio control linkage to said first position and second pressure-responsive means mounted on said pedal surface at said second location for selectively communicating power from said source to said actuator to shift said ratio control linkage to said second position.

5. A control linkage system for selective directional control of a control member upon unidirectional movement of a single control pedal, comprising:

a foot pedal mounted for pivotal movement about a first axis from a zero position in a first direction through a control range, said pedal having a surface for receiving an operator's foot which surface is fixed against pivoting movement about any axis other than said first axis;

a control element remotely positioned from said control pedal and mounted for movement in alternate forward and reversed directions from a neutral position;

linkage means mechanically linking said control pedal to said control element and including shifting means for selectively shifting said linkage means to a first position for causing movement of said control element in said forward direction from said neutral position thereof upon movements of said foot pedal in said first direction in response to placement of said operator's foot at a first location on said pedal surface, and for shifting said linkage means to a second position for movement of said control element in said reversed direction upon said movements of said foot pedal in said first direction in response to placement of said operator's foot at a second different location on said pedal surface, said linkage means having a lever mounted for rotation about a second axis spaced from and parallel to said first axis and including arm means defining a slot having a midpoint spaced apart from said second axis and extending transverse to and to either side of the plane defined by said midpoint and said second axis; said linkage means also having an elongated link member connecting said pedal to said lever and pin means slidably mounted in said slot for connecting said link member to said lever for transmitting motion from said pedal thereto;

actuator means for selectively shifting said pin towards either end of said slot, a source of power for said actuator means; and first pressure-responsive means mounted on said pedal surface at said first location for selectively communicating said power from said source to said actuator to shift said linkage means to said first position, and second pressure-responsive means mounted on said pedal at said second location for selectively communicating said power from said source to said actuator.

6. The control linkage of claim 5 including means for normally biasing said pin means to a position in said slot at which said link member is aligned with a radius of said second axis for establishing a neutral position of said control member; and wherein said link member includes lost motion means permitting movement of said pedal for movement of a throttle linkage member without movement of said lever.

* * * * *